United States Patent

Hamajima et al.

[11] Patent Number: 5,583,768
[45] Date of Patent: Dec. 10, 1996

[54] SHIFT CONTROL SYSTEM FOR PREVENTING ENGINE RACING

[75] Inventors: Tetsuo Hamajima, Toyota; Hidehiro Oba, Aichi-ken; Hiromichi Kimura; Masahiko Ando, both of Okazaki; Akira Fukatsu, Anjo; Yoshihisa Yamamoto, Nishio; Masahiro Hayabuchi, Anjo; Kazumasa Tsukamoto, Toyota, all of Japan

[73] Assignee: Aisin Aw Co., Ltd., Japan

[21] Appl. No.: 611,972

[22] Filed: Mar. 6, 1996

Related U.S. Application Data

[63] Continuation of Ser. No. 253,677, Jun. 3, 1994, abandoned.

[30] Foreign Application Priority Data

Jun. 3, 1993 [JP] Japan ............................ 5-157988

[51] Int. Cl.$^6$ ............................................. B60K 41/06
[52] U.S. Cl. ............... 364/424.002; 477/83; 477/117; 477/120
[58] Field of Search ............. 364/424.1; 477/80, 477/86, 127, 130, 131, 159, 160, 161, 163, 164, 168, 169, 174, 175, 176, 177, 180, 95, 116, 117, 83, 120

[56] References Cited

U.S. PATENT DOCUMENTS

| | | | |
|---|---|---|---|
| 4,632,231 | 12/1986 | Hattori et al. | 477/175 |
| 4,667,540 | 5/1987 | Yagi | 364/424.1 |
| 4,858,499 | 8/1989 | Ito et al. | 477/63 |
| 5,003,842 | 4/1991 | Hatta et al. | 188/1.11 X |
| 5,018,068 | 5/1991 | Aoki et al. | 364/424.1 |
| 5,027,676 | 7/1991 | Fujiwara et al. | 477/163 X |
| 5,101,350 | 3/1992 | Tokoro | 364/424.1 |
| 5,128,868 | 7/1992 | Imai et al. | 364/424.1 |
| 5,206,805 | 4/1993 | Petzold et al. | 364/424.1 |
| 5,207,122 | 5/1993 | Minagawa | 475/123 |

FOREIGN PATENT DOCUMENTS

| | | |
|---|---|---|
| 0288779 | 11/1988 | European Pat. Off. |
| 0331523 | 9/1989 | European Pat. Off. |
| 0435377 | 7/1991 | European Pat. Off. |
| 0475585 | 3/1992 | European Pat. Off. |
| 0524450 | 1/1993 | European Pat. Off. |
| 0578223 | 1/1994 | European Pat. Off. |
| 0583954 | 2/1994 | European Pat. Off. |

OTHER PUBLICATIONS

Patent Abstracts of Japan, vol. 14, No. 193, Feb. 1990.

*Primary Examiner*—Collin W. Park
*Attorney, Agent, or Firm*—Lorusso & Loud

[57] ABSTRACT

A shift control system for shifting an automatic transmission from a predetermined gear stage to another by draining an oil pressure from predetermined frictional engagement element to release the same frictional engagement element and by feeding the oil pressure to another frictional engagement element to engage the same frictional engagement element while controlling the drain oil pressure of the frictional engagement element to be released and the engaging oil pressure to the frictional engagement element to be engaged. The shift control system includes an engine racing detector for detecting the racing of the engine while the transmission is being shifted in a clutch-to-clutch manner, and a hydraulic control circuit for controlling at least one of the drain oil pressure and the engaging oil pressure, on the basis of the degree of racing of the engine, as detected by the engine racing detector, such that the amount of racing of the engine falls within a predetermined range. Since the rotational state of the engine being shifted is controlled by hydraulic control of the frictional engagement elements participating in the clutch-to-clutch shift, it is possible to reliably prevent any excessive racing of the engine and to prevent reduction of output shaft torque due to the tie-up of the frictional engagement elements.

6 Claims, 6 Drawing Sheets

| | $C_0$ | $C_1$ | $C_2$ | $B_0$ | $B_1$ | $B_2$ | $B_3$ | $B_4$ | $F_0$ | $F_1$ | $F_2$ |
|---|---|---|---|---|---|---|---|---|---|---|---|
| N | | | | ◌ | | | | | | | |
| Rev | | | ○ | ○ | | | | ○ | | | |
| 1st | ○ | ○ | | | | | | ◉ | ○ | | ○ |
| 2nd | ◉ | ○ | | | | | ○ | | ○ | | |
| 3rd | ○ | ○ | | | ◉ | ○ | | | ○ | ○ | |
| 4th | ○ | ○ | ○ | | | △ | | | ○ | | |
| 5th | | ○ | ○ | ○ | | △ | | | | | |

SHIFT CONTROL SYSTEM FOR PREVENTING ENGINE RACING

This application is a continuation of application Ser. No. 08/253677, filed 3 Jun. 1994, now abandoned.

BACKGROUND OF THE INVENTION

1. Field of the Invention

The present invention relates to a system for controlling the shift of an automatic transmission and, more particularly, to a shift control system for controlling execution of a so-called "clutch-to-clutch shift".

2. Related Art

A shift effected by releasing a first frictional engagement element and by engaging a second frictional engagement element, is called a "clutch-to-clutch shift". When such a shift is an upshift a transitional "overlap state" occurs in which the two frictional engagement elements temporarily have a torque capacity higher than a predetermined value whereas, when a downshift, a transitional "underlap state" occurs in which the two frictional engagement elements are simultaneously temporarily released. The shift is effected by oil pressure which is controlled by electric signals.

At the time of the aforementioned shift in the prior art, the controlled oil pressure is corrected in subsequent and later shifts by detecting the racing of the engine in terms of the input/output R.P.M. so as to prevent the excessive engine racing, which is caused by the failure of the oil pressure to change, as expected, responsive to the electric signals or by a reduction of the output shaft torque due to tie-up (as disclosed in U.S. Pat. No. 5,018,068).

In the prior art referred to above, however, the correction of the controlled oil pressure is set so that the engine will not excessively race. Since the controlled oil pressure in not corrected when racing of the engine is not detected, the output shaft torque drops and thereby invites shift shock if tie-up occurs.

It is theoretically possible to detect the tie-up so that the correction of the controlled oil pressure may be set on the basis of the detected value for tie-up. However, it is difficult to detect tie-up from the input/output R.P.M. Still worse, detection of tie-up would be costly, and would require a larger system to accommodate a special torque sensor for detecting the torque from the input/output shaft, for example. Further, such an arrangement would require the automatic transmission to be substantially modified.

SUMMARY OF THE INVENTION

It is, therefore, an object of the present invention to solve the above-specified problems and to provide a shift control system capable of preventing any drop of the output shaft torque and any excessive racing due to a tie-up in the clutch-to-clutch shift.

In order to achieve the above-specified object, according to the present invention, there is provided a shift control system for an automatic transmission, including: first and second frictional engagement elements and first and second hydraulic servos for applying/releasing the first and second frictional engagement elements by feeding/draining oil pressure thereto, to effect a shift from a predetermined gear stage to another gear stage by draining the oil pressure from the first hydraulic servo to release the first frictional engagement element and by feeding the oil pressure to the second hydraulic servo to engage the second frictional engagement element, while controlling the drain oil pressure from the first hydraulic servo and the feed oil pressure to the second hydraulic servo during the gear stage shift. The system of the present invention includes engine racing detecting means, for detecting a racing state of the engine during the shift, and hydraulic control means for comparing the engine racing state detected by the racing detector means with a target racing state in which the engine races to a predetermined extent relative to the non-racing state of the engine. At least one of the drain oil pressure and the engaging oil pressure is controlled to realize the target racing state, such that the racing of the engine is lowered, if it is higher than the target value, but is raised if it is lower than the target value.

The automatic transmission controlled according to the present invention has first frictional engagement means including a first frictional engagement element and a first hydraulic servo, for releasing the first frictional engagement element as oil pressure is drained therefrom, and second frictional engagement means including a second frictional engagement element and a second hydraulic servo, for engaging the second frictional engagement element when the oil pressure is fed thereto, so that the shift from the predetermined gear stage to another is executed by releasing the first frictional engagement element and engaging the second frictional engagement element. At the time of this shift, the drain oil pressure and the feed oil pressure of the individual first and second hydraulic servos are controlled, but these controls are carried out on the basis of the racing state of the engine E. Specifically, at the time of that shift, the racing state of the engine E is detected by engine racing detecting means 3, and at least one of the feed oil pressure and the drain oil pressure is controlled by hydraulic control means 4 on the basis of the detected racing, so that the racing state of the engine may be continuously reset to a target racing state in which the engine races to a predetermined extent. Specifically, at least one of the drain oil pressure and the feed oil pressure is corrected by setting the correction of the duty ratio to a zero value if the racing state of the engine is identical to the target racing state, to a positive value if the racing state of the engine is higher than the target racing state, and to a negative value if the racing of the engine is lower than the target racing state.

DESCRIPTION OF THE PREFERRED EMBODIMENT

One embodiment of the present invention will be described in the following with reference to the accompanying drawings.

Figure 2:
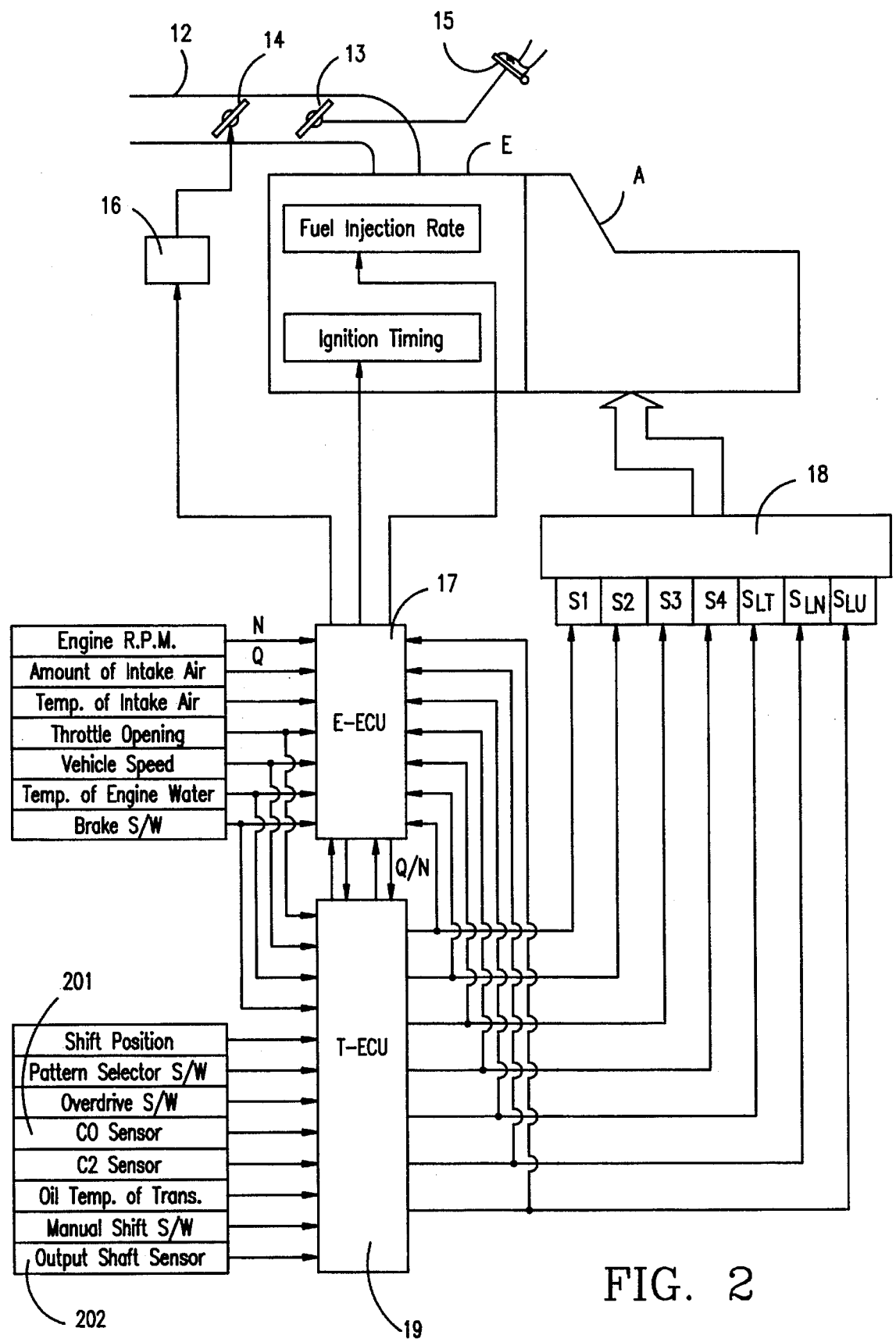
FIG. 2 is a block diagram showing a control system according to one embodiment of the present invention.

FIG. 2 is a diagram showing an entire control system of an embodiment of the present invention. An engine E, connected to the automatic transmission A, is equipped in its air intake 12 with a main throttle valve 13 and a sub-throttle valve 14 located upstream of the former. The main throttle valve 13 is controlled by depression of an accelerator pedal 15. On the other hand, the subthrottle valve 14 is controlled by a motor 16. There is provided an engine electronic control unit (E-ECU) 17 for controlling the motor 16 to regulate the sub-throttle valve 14 and for controlling the fuel injection rate and the ignition timing of the engine E. This electronic control unit 17 is composed mainly of a central processing unit (CPU), memory units (RAM and ROM) and an input/output interface and is fed a variety of control signals including engine (E/G) R.P.M. N, amount of intake air Q, temperature of intake air, throttle opening, vehicle speed, temperature of engine water and brake switch position.

In the automatic transmission A, a hydraulic control unit 18 controls shifting and operation of a lockup clutch. The hydraulic control unit 18 is electrically controlled and is equipped with: first to third shift solenoid valves S1 to S3 for executing the shift: a fourth solenoid valve S4 for controlling engine braking; a linear valve SLN for controlling accumulator back pressure; and a linear solenoid valve SLU for controlling the lockup clutch.

There is further provided an automatic transmission electronic control unit (T-ECU) 19 for controlling the shift, the line pressure and/or the accumulator back pressure by outputting signals to the appropriate solenoid valves. This electronic control unit 19 is composed mainly of a central processing unit (CPU), memory units (RAM and ROM) and an input/output interface and receives control signals for the throttle opening, the vehicle speed, the engine water temperature, the brake switch position, the shift position, a pattern select signal, and an overdrive switch position. The electronic control unit 19 also receives a signal coming from a CO sensor 201 which detects the R.P.M. of a later-described clutch CO, a signal coming from an output shaft sensor 202 for detecting the R.P.M. of an output shaft 65, a signal coming from a C2 sensor for detecting the R.P.M. of a second clutch C2, a signal representative of the oil temperature of the automatic transmission, and a signal from a manual shift switch.

Moreover, the automatic transmission electronic control unit 19 and the engine electronic control unit 17 are connected with each other for data communication. Specifically, signals, such as a signal for the amount of intake air per revolution (Q/N), are sent from the engine electronic control unit 17 to the automatic transmission electronic control unit 19, whereas signals, such as a signal equivalent to a command signal for each solenoid valve or a signal for commanding a gear stage, are sent from the automatic transmission electronic control unit 19 to the engine electronic control unit 17.

More specifically, the automatic transmission electronic control unit 19 decides the gear stage, ON/OFF of the lockup clutch, the regulated pressure level of the line pressure and the engaging pressure on the basis of the input data and the map stored in advance and outputs a command signal to the appropriate solenoid valve on the basis of a decision that a failure has occurred or directs another control function upon making such a decision. On the other hand, the engine electronic control unit 17, not only controls the fuel injection rate, the ignition timing and/or the opening of the sub-throttle valve 14 on the basis of the input data, but also lowers the output torque temporarily by reducing the fuel injection rate at the time of shifting the automatic transmission A, by changing the ignition timing and/or by throttling the opening of the sub-throttle valve 14.

Figure 3:
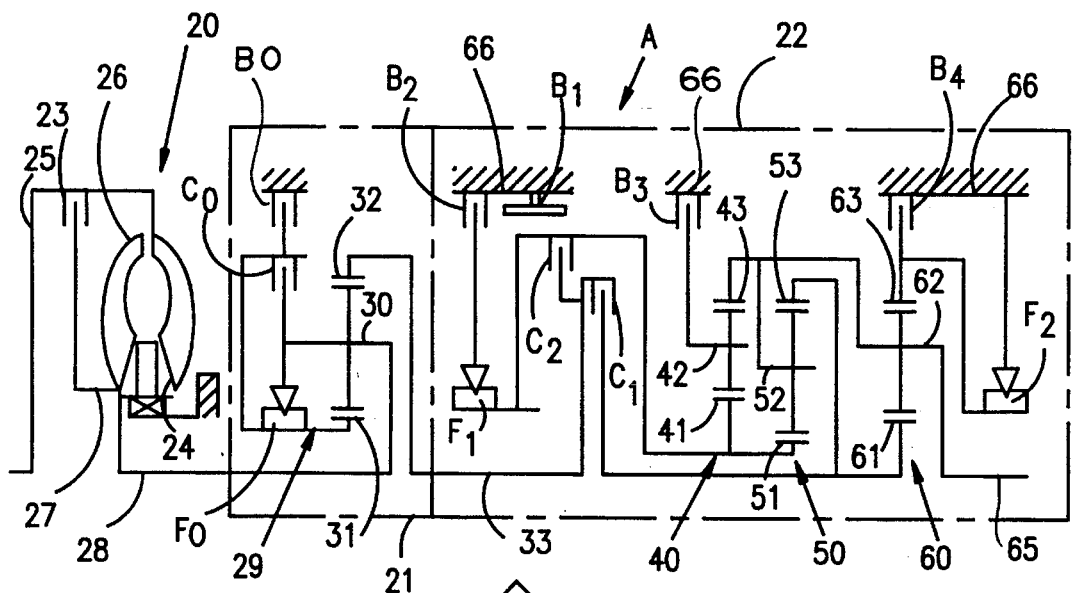
FIG. 3 is a schematic diagram showing a gear train of the main portion of an automatic transmission to which the present invention is applied.

FIG. 3 is a diagram showing one embodiment of the gear train of the automatic transmission A described above, which embodiment has five forward and one reverse gear stages. Specifically, the automatic transmission A includes a torque converter 20, an auxiliary transmission unit 21 and a main transmission unit 22. The torque converter 20 is equipped with a lockup clutch 23 which is interposed between a front cover 25 integrated with a pump impeller 24 and a member (or hub) 27 integrated with a turbine runner 26. The engine has its crankshaft (neither is shown in FIG. 3) connected to the front cover 25, and an input shaft 28 having the turbine runner 26 connected thereto is connected to a carrier 30 of an overdrive planetary gear mechanism 28 constituting the auxiliary transmission unit 21.

Between the carrier 30 and a sun gear 31 of the planetary gear mechanism 29, there are interposed the multi-disc clutch CO and a one-way clutch FO. Incidentally, this one-way clutch FO is engaged when the sun gear 31 rotates forward (i.e., in the direction of rotation of the input shaft 28) relative to the carrier 30. There is also provided a multi-disc brake BO for selectively braking the rotation of the sun gear 31. Moreover, a ring gear 32 acting as the output element of the auxiliary transmission unit 21 is Connected to an intermediate shaft 33 acting as the input element of the main transmission unit 22.

In the auxiliary transmission unit 21, therefore, the planetary gear mechanism 29 rotates as a whole with the multi-disc clutch CO or the one-way clutch FO being engaged, so that the intermediate shaft 33 rotates at the same speed as that of the input shaft 28, thus establishing a lower gear stage. With the brake BO being engaged to stop the rotation of the sun gear 31, moreover, the ring gear 32 accelerates relative to the rotary speed of the input shaft 28 to establish a higher gear stage.

The main transmission unit 22 is equipped with three planetary gear sets 40, 50 and 60, which have their individual rotary elements connected, as follows. Specifically, a sun gear 41 of the first planetary mechanism 40 and a sun gear 51 of the second planetary mechanism 50 are integrally connected to each other. Moreover, a ring gear 43 of the first planetary mechanism 40, a carrier 52 of the second planetary mechanism 50 and a carrier 62 of the third planetary mechanism 60 are connected to one another, and an output shaft 65 is connected to the carrier 62 of the third planetary mechanism 60. In addition, the second planetary mechanism 50 has its ring gear 53 connected to a sun gear 61 of the third planetary mechanism 60.

The gear train of this main transmission unit 22 can establish one reverse and four forward gear stages and is composed of the following clutches and brakes for this purpose. Of these, the clutches will be described first. A first clutch C1 is interposed between a ring gear 53 of the second planetary mechanism 50 and the sun gear 61 of the third planetary mechanism 60, which are connected to each other, and the intermediate shaft 33. Moreover, the second clutch C2 is interposed between the sun gear 41 of the first planetary mechanism 40 and the sun gear 51 of the second planetary mechanism 50, which are connected to each other, and the intermediate shaft 33.

With regard to the brakes, a first brake B1 is a band brake which is arranged to stop the rotations of the sun gears 41 and 51 of the first and second planetary mechanisms 40 and 50. Between these sun gears 41 and 51 (i.e., the common sun gear shaft) and casing 66, there are arrayed in series a first one-way clutch F1 and a second brake B2 which is a multi-disc brake. Of these, the first one-way clutch F1 is applied when the sun gears 41 and 51 are to rotate backward (relative to the direction of rotation of the input shaft 28). A third brake B3 or a multi-disc brake is interposed between a carrier 42 of the first planetary mechanism 40 and the casing 66. Between a ring gear 63 of the third planetary mechanism 60 and the casing 66, there are arranged in parallel a fourth brake B4 or a multi-disc brake, for braking the rotation of the ring gear 63, and a second one-way clutch F2. Incidentally, this second one-way clutch F2 is applied when the ring gear 63 is to rotate backward.

Figure 4:
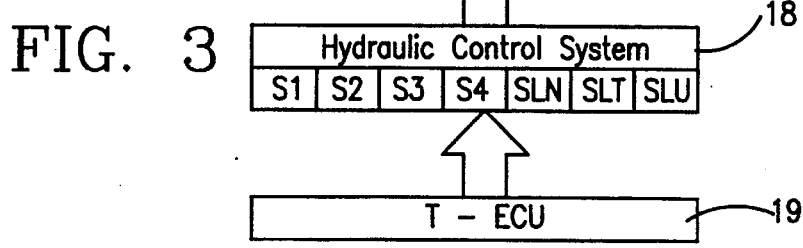
FIG. 4 is a table of brake/clutch operation for setting individual gear stages.

The automatic transmission A thus far described can establish five forward and one reverse gear stages by applying/releasing the individual clutches and brakes, as tabulated the table of FIG. 4. In FIG. 4: symbols ζ indicate the engaged state; symbols ● indicate the engaged state to be assumed at the time of engine braking; symbols Δ indicate the engaged or released state; and blanks indicate the released state.

Figure 1:
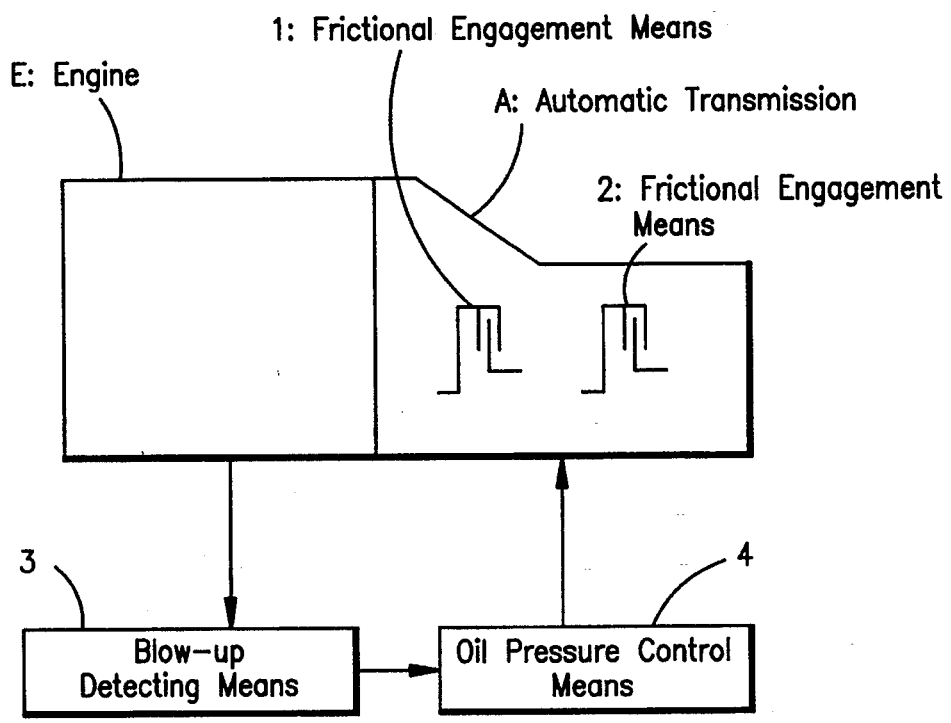
FIG. 1 is a block diagram illustrating the present invention.
Figure 5:
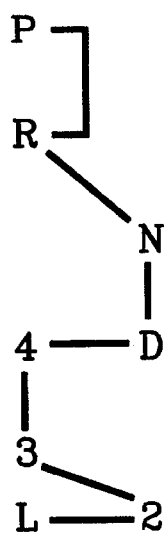
FIG. 5 is a diagram showing an array of shift lever positions for selection of a range.

The individual gear stages appearing in FIG. 4 are set in accordance the running range selected by operation of the shift lever (not shown), and the positions of those running ranges to be selected by the shift lever are arrayed as shown in FIG. 5. Specifically, a parking (P) range position is followed by a reverse (R) range position and a neutral (N) range position is arranged subsequent to the R-range position but oblique to the array of the P-range and R-range positions. A drive (D) range position is arranged subsequent to the N-range in parallel with the alignment of the P-range and the R-range positions. Moreover, a 4th speed range position is arranged subsequent to and at a right angle relative to the alignment of the N-range and D-range positions. In addition, a 3rd speed range position is arranged subsequent to the 4th speed range position in parallel with the alignment of the N-range and the D-range. Moreover, a 2nd speed range position is angled off from 3rd speed range position and is in alignment with the D-range and N-range positions. Finally, a low (L) range position is opposite the 2nd range position, in alignment with the 3rd and 4th speed range positions.

The D-range can establish the five forward gear stages; the 4th speed range can establish four of the forward gear stages, but not the 5th speed or the overdrive gear stage; the 3rd speed range can establish the gear stages through the 3rd speed; the 2nd speed range can establish the gear stages through the 2nd speed; and the L-range can establish only the first speed. Therefore, by manually moving the shift lever between the 3rd speed range and the 2nd speed range positions, there is established either an upshift from the 2nd speed to the 3rd speed or a downshift from the 3rd speed to the 2nd speed.

As indicated by the table of FIG. 4, the shifts between the 2nd speed and the 3rd speed are clutch-to-clutch shifts in which both the engagement and release of the second brake B2 and the third brake B3 occur simultaneously. In order to smooth these shifts, a hydraulic circuit as shown in FIG. 6 is incorporated into the aforementioned hydraulic control unit 18.

Figure 6:
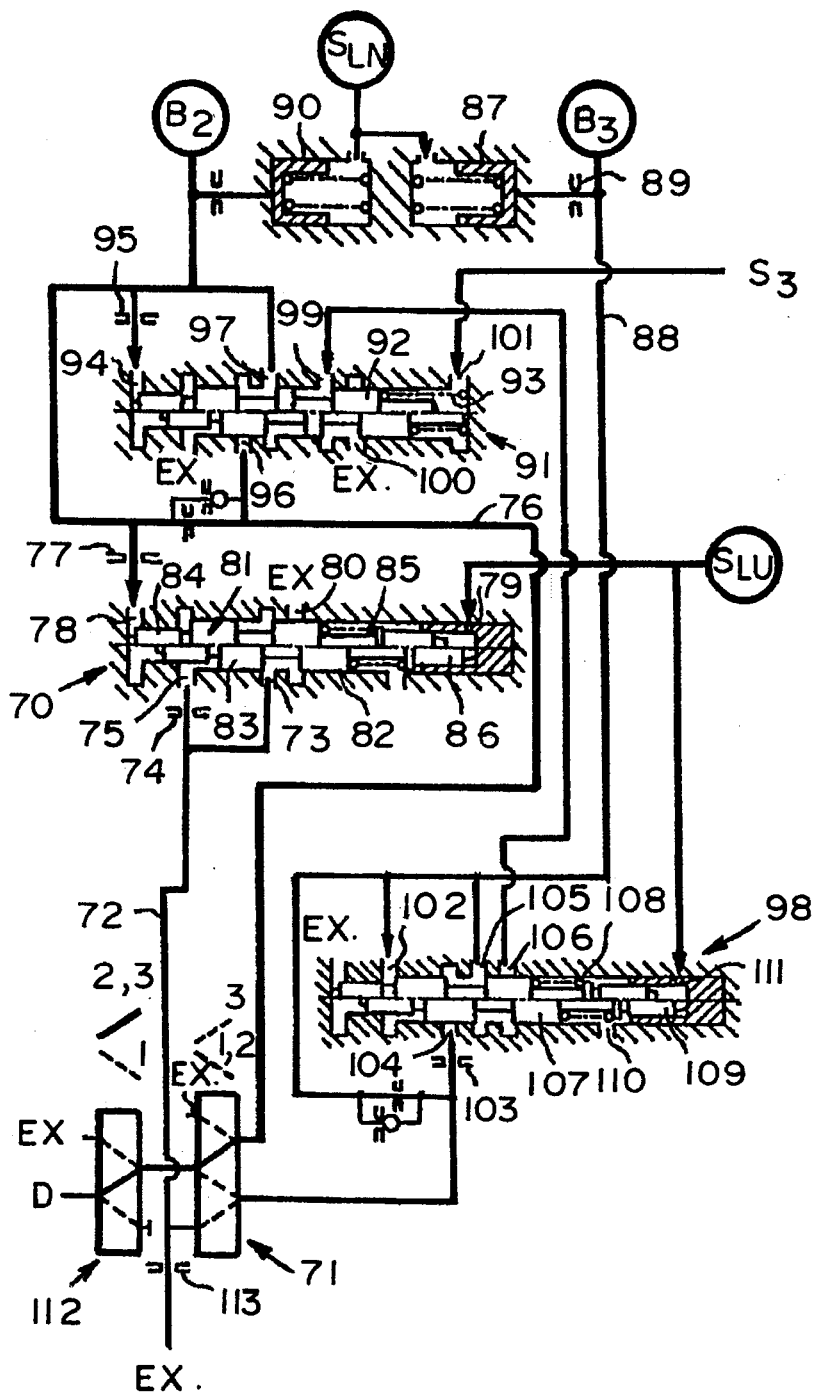
FIG. 6 is a diagram showing a portion of the hydraulic circuit.

In FIG. 6, reference numeral 70 designates a 2-3 timing valve. The 2-3 timing valve 70 has an inlet port 73 communicating with a drain oil passage 72 of a 2-3 shift valve 71; a drain pressure input port 75 communicating with the drain oil passage 72 through an orifice 74; an input port 78 communicating with a supply oil passage 76 leading from the 2-3 shift valve 71 to the second brake B2 through an orifice 77; a signal port 79 for receiving the signal pressure from the linear solenoid valve SLU for the lockup clutch; and a drain port 80. The spool 81 of the 2-3 timing valve 70 has a land 82 at one end for opening/closing the drain port 80; an intermediate land 83 separating the drain pressure input port 75 from the inlet port 73 and having a drain pressure receiving face facing the drain pressure input port 75; and a radially reduced land 84 positioned at the end opposite land 82 for separating the input port 78 from the drain pressure input port 75 and having a supply pressure receiving face. The land 82 has one end abutting a pressure receiving piston 86 through a spring 85, and the pressure receiving piston 86 has a face for receiving the signal pressure coming from the signal port 79.

An accumulator 87 for the third brake B3 is connected through an orifice 89 to an oil passage 88 leading to the third brake B3 and to provide its back pressure for controlling the engagement of the third brake B3, responsive to the signal pressure coming from the aforementioned linear solenoid valve SLN. An accumulator 90 for the second brake B2 likewise provides a back pressure for controlling engagement of the second brake B2, responsive to the signal pressure coming from the linear solenoid valve SLN.

In FIG. 6, reference numeral 91 designates a B-2 orifice control valve constituting fast fill means for the second brake B2. This B-2 orifice control valve 91 has a control port 94 at its end opposite a spring 93 which urges a spool 92 in the axial direction. The control port 94 communicates with the second brake B2 through an orifice 95. The B-2 orifice control valve 91 has a centrally positioned input port 96 connected with either the aforementioned supply oil passage 76 or a second brake port 97, depending on the position of the spool 92, for communication with the second brake B2. A third brake port 99 is connected to the third brake B3 through a later-described B-3 control valve 98, and a drain port 100 either communicates with the third brake port 99 or is blocked, depending on the position of the spool 92. At the end abutting the spring 93 is provided a signal port 101 which receives the signal pressure from the third solenoid valve S3.

Here will be described the B-3 control valve 98 which controls the rate of applying/releasing the oil pressure of the third brake B3. This B-3 control valve 98 is provided with a signal port 102 connected to the oil passage 88 for causing the oil pressure of the third brake B3 to act as the signal pressure. A D-port 104 is connected to the 2-3 shift valve 71 through an orifice 103. A brake port 105 either communicates with the D-port 104 or is blocked therefrom, depending on the position of the spool 107, and is further connected to the oil passage 88. A brake port 106 either communicates with the brake port 105 or is blocked therefrom, depending upon the position of the spool 107, and is connected to the third brake port 99 in the aforementioned B-2 orifice control valve 91. A spool 107 for opening/closing those ports has one end abutting against a piston 109 through a spring 108. The B-3 control valve 98 further has a control port 110, which is located between the spool 107 and the piston 109 and which receives the 3rd speed pressure. A signal pressure port 111 receives the signal pressure of the linear solenoid valve SLU for the lockup clutch, which signal pressure is applied to the piston 109. Incidentally, reference numeral 112 appearing in FIG. 6 designates a 1-2 shift valve, and numeral 113 designates an orifice formed in the drain oil passage 74.

In the hydraulic control unit 18 having the aforementioned hydraulic circuit incorporated therein, the 2-3 timing valve 70 and the B-3 control valve 98 receive as their control pressure, the signal pressure of the linear solenoid valve SLU for the lockup clutch, so that the timing for applying/releasing the oil pressure of the third brake B3 is controlled by that linear solenoid valve SLU. Specifically, this control is effected by controlling the duty ratio of the linear solenoid valve SLU by the electronic control unit 19 such that the duty ratio is controlled responsive to the detected racing of the engine E. An example of this control routine is shown in FIG. 7.

Figure 7:
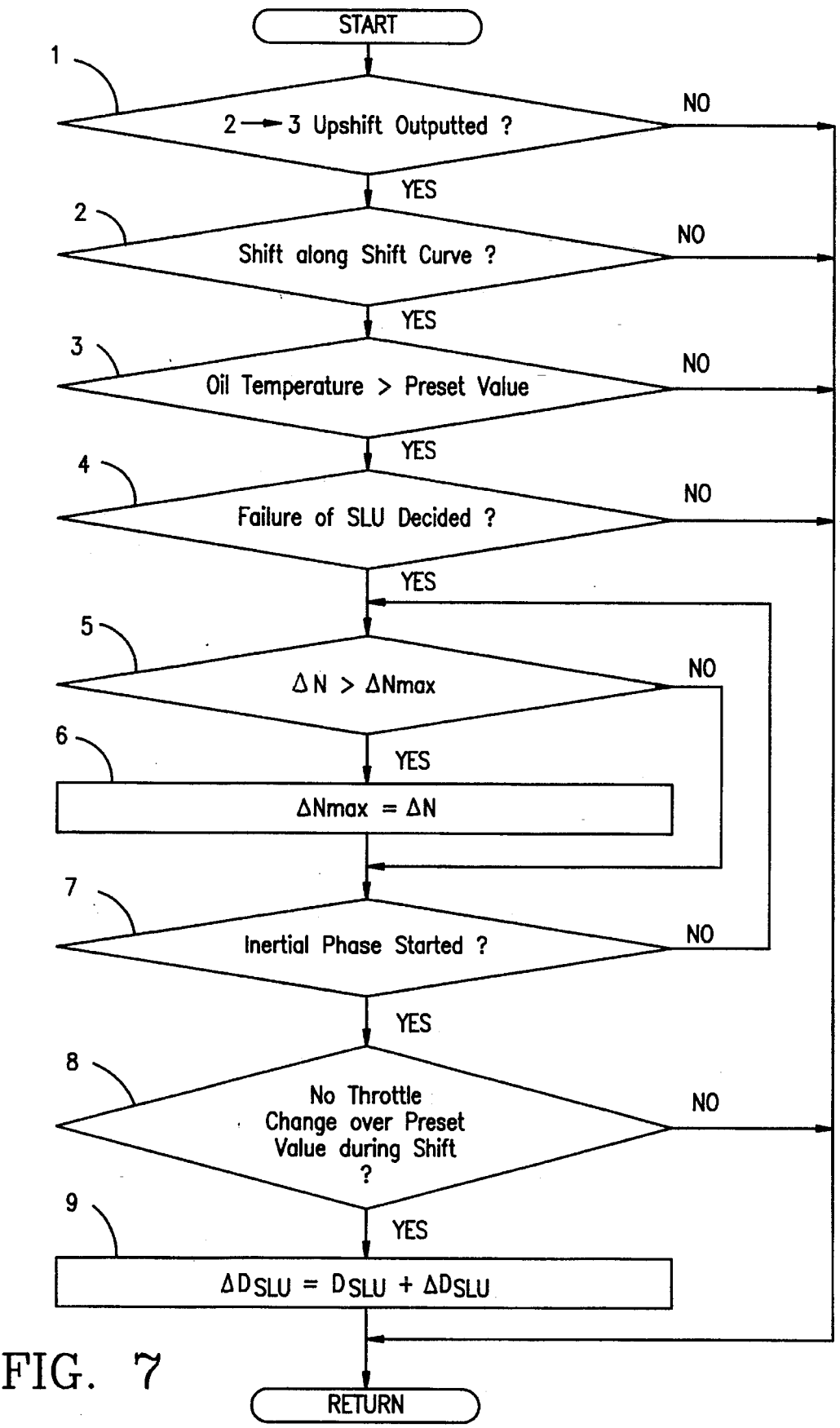
FIG. 7 is a flow chart showing a control routine for learning/controlling the solenoid duty ratio on the basis of the detected racing state of the engine.

FIG. 7 illustrates control of an upshift from the 2nd to 3rd speeds. First of all, at step 1, it is decided whether or not that upshift has been commanded. If commanded, it is decided at step 2 whether or not the upshift is along the shift curve. If this shift curve is followed, it is decided (at step 3) whether or not the oil pressure exceeds a preset constant value, and (at step 4) whether or not a failure of the aforementioned linear solenoid valve SLU has been decided. In other words, step 3 is executed because the automatic transmission A has to be in a stable state, and step 4 is executed because the normal operation of the linear solenoid valve SLU is premised by the overlap control.

Next, the maximum racing of the engine E prior to the inertial phase is determined. Specifically, it is decided at step 5 whether or not the difference $\Delta N$ ($=N_{en}-N_{en-1}$) between the R.P.M. $N_{en}$ of the engine E obtained at this time and the R.P.M. $N_{en-1}$ of the engine E obtained at the previous time is larger than the maximum $\Delta N_{max}$ previously obtained. If the decision is "YES" the R P M difference $\Delta N$ is fixed at the maximum (at step 6), and it is then decided (at step 7) whether or not the inertial phase (steady state) has started. If this inertial phase has not started, the routine is returned upstream of step 5, and it is decided again whether or not the difference between the engine R.P.M. detected at the previous time and the engine R.P.M. detected at this time exceeds the maximum already fixed. If this decision is "NO", the routine skips step 6 to step 8. In other words, the maximum for the rotational speed fluctuations of the engine E, i.e., the maximum of the amount of racing prior to the start of the inertial phase, is determined by repeating the operations of step 5 and step 6 until the inertial phase starts (steady state is achieved).

Figure 8:
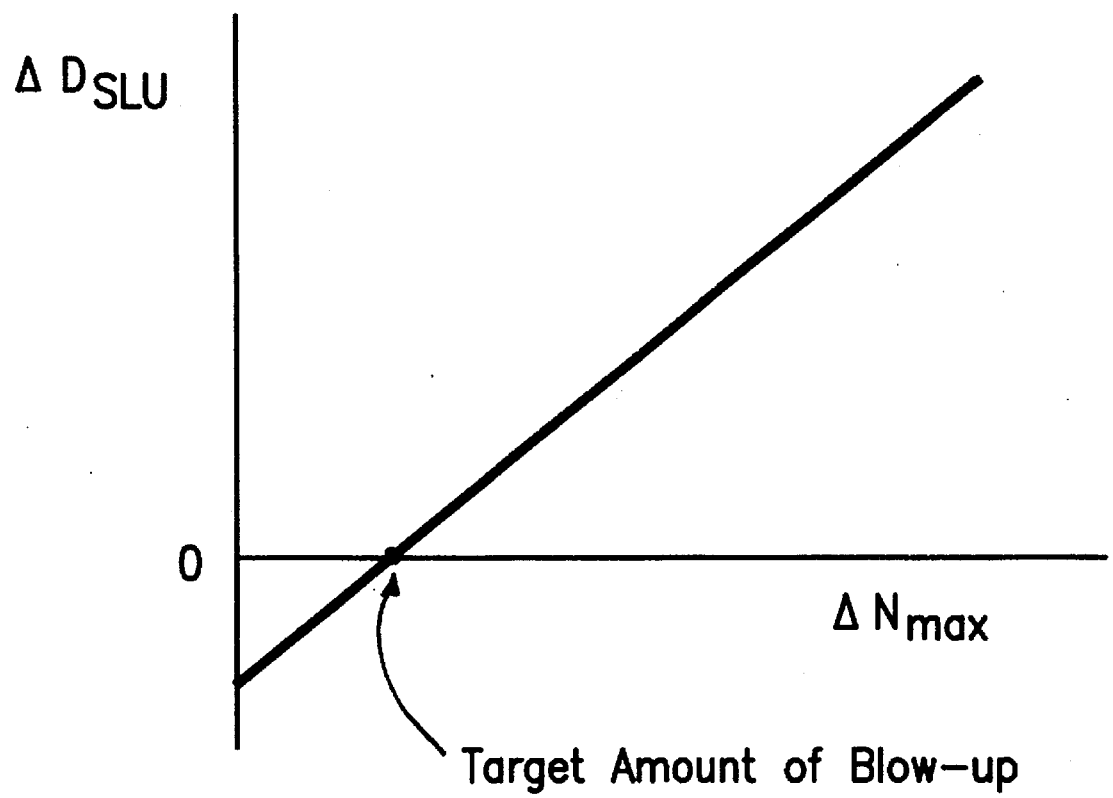
FIG. 8 is a graph plotting the relationship between the racing of the engine $\Delta N$ and the correction value of the duty ratio $\Delta Dslu$.

If the inertial phase has started, it is decided (at step 8) whether or not the amount of throttle change has exceeded a preset value during the shift If this decision is "YES", comparison is made between the aforementioned maximum for racing of the engine E and a target amount for racing. If the maximum racing of the engine E exceeds the aforementioned target amount of racing, a correction value $\Delta$ Dslu is added (at step 9) to the duty ratio Dslu which has already been fixed for controlling the aforementioned linear solenoid valve SLU. This correction value $\Delta$ Dslu is set according to the maximum racing 6 $N_{max}$ in the inertial phase and is plotted by way of example in FIG. 8. Specifically, in case the racing of the engine E is high, the duty ratio Dslu is augmented by increasing the correction value $\Delta$ Dslu, so that the degree of overlap between the second brake B2 and the third brake B3 may be increased.

If the maximum racing of the engine E is lower than the target value for same, $\Delta$ Dslu is set to a negative value to lower the duty ratio of the aforementioned linear solenoid valve SLU. In short, the control has an underlap tendency.

If, on the other hand, the aforementioned decision in any of steps 1 to 4 and step 8 is "NO", no special control is performed and the control cycle is repeated.

In the control unit thus-far described, therefore, the overlap state or the underlap state between the frictional engagement means which take part in the clutch-to-clutch shift is controlled either while detecting the racing of the engine E or according to the detected result, so that the amount of racing of the engine E can be confined within a target range without being influenced by the aging (deterioration) of the hydraulic circuit or the like.

Incidentally, in the foregoing embodiment, the R.P.M. difference of the engine is used as a measure of the amount of engine racing, but engine racing may also be determined from the difference between (1) the CO clutch R.P.M. detected by a CO (clutch speed) sensor and (2) the product of the R.P.M. of the output shaft, as detected by the output shaft sensor 202, and the gear ratio of the 2nd speed. Moreover, the embodiment is exemplified by a learning control in which the duty ratio is updated on the basis of the amount of engine racing prior to the start of the inertial phase. In the present invention, however, the duty ratio may be controlled on a real time basis.

The control system of the present invention is not limited to overlap control for a clutch-to-clutch upshift but, rather, can be applied to an underlap control for a clutch-to-clutch downshift. While the foregoing embodiment has been described in the context of an automatic transmission having the gear train shown in FIG. 3, the present invention is not limited to such an embodiment and can also be utilized as a control unit for an automatic transmission having a gear train of another construction, so that it can be applied to overlap control for a clutch-to-clutch upshift other than the described upshift from the 2nd to 3rd speeds. In the resent invention, furthermore, the hydraulic circuit for the overlap control is not limited to that having the construction shown in FIG. 5.

As has been described in the foregoing, according to the shift control system of the present invention, at least one of the releasing oil pressure and the applying oil pressure is subjected to such a learning control by correcting the duty ratio that the degree of racing of the engine for the clutch-to-clutch shift may be continuously changed, from the non-racing state of the engine to the state of a predetermined, target racing. As a result, it is possible to reliably prevent a drop of the output shaft torque, which might otherwise be caused by the tie-up of the two frictional engagement elements due to the aging of the control device, e.g. the hydraulic control circuit, and to prevent any excessive racing of the engine.

What is claimed is:

1. A shift control system for an automatic transmission which receives output of an engine subject to a degree of engine racing during a shift, said shift control system comprising:

first and second frictional engagement elements within said transmission for effecting a shift from one gear stage to another gear stage;

first and second hydraulic servos for applying/releasing said first and second frictional engagement elements by feeding/draining oil pressures, so that a shift is made from a predetermined gear stage to another gear stage by draining the oil pressure from said first hydraulic servo to release said first frictional engagement element and by feeding oil pressure to said second hydraulic servo to engage said second frictional engagement element, while controlling the drain oil pressure from said first hydraulic servo and the feed oil pressure to said second hydraulic servo during said gear stage shift;

engine racing detecting means for detecting the degree of engine racing during said shift and for determining the maximum for the detected degree of engine racing until start of an inertial phase;

comparison means for comparing said maximum detected engine racing with a target amount of racing; and hydraulic control means for controlling at least one of the drain oil pressure and the engagement oil pressure by a fixed duty ratio of an electromagnetic solenoid valve until start of said inertial phase, and for changing said duty ratio, after start of said inertial phase, responsive to said comparison, to achieve said target racing state, such that the racing of the engine is reduced if said maximum detected engine racing is higher than said target amount of racing, but is raised if said maximum detected engine racing is lower than said target amount of racing.

2. A shift control system according to claim 1, wherein said hydraulic control means includes correction means for correcting said duty ratio by adding a correction value which is set to a zero value if said maximum detected engine racing is identical to said target amount of racing, to a positive value if said maximum detected engine racing is higher than said target amount of racing, and to a negative value if said maximum detected engine racing is lower than said target amount of racing.

3. A shift control system according to claim 1, wherein a pressure regulator valve regulates the oil pressure to be drained from said first hydraulic servo.

4. A shift control system in accordance with claim 1 wherein said automatic transmission receives said output of said engine through a torque converter.

5. A shift control system according to claim 1 wherein said first and second frictional engagement elements are clutches and wherein said engine racing detecting means detects engine racing due to overlap in operation of said first and second frictional engagement elements during an upshift wherein one of said first and second frictional engagement elements is engaging while the other of said first and second frictional engagement elements is disengaging.

6. A control system according to claim 1 wherein said first and second frictional engagement elements are clutches and wherein said engine racing detecting means detects engine racing due to underlap in operation of said first and second frictional engagement elements during a downshift in which one of said first and second frictional engagement elements is engaging while the other of said first and second frictional engagement elements is disengaging.

* * * * *

UNITED STATES PATENT AND TRADEMARK OFFICE
CERTIFICATE OF CORRECTION

PATENT NO. : 5,583,768
DATED : December 10, 1996
INVENTOR(S) : HAMAJIMA et al

It is certified that error appears in the above-indentified patent and that said Letters Patent is hereby corrected as shown below:

Title page, item
[75] Inventors: "Tetsuo Hamajima, Toyota;" should read --Tetsuo Hamajima, Aichi-ken;--;

"Hiromichi Kimura;" should read --Hiromichi Kimura, Aichi-ken--; and after "Ando" delete "both of" and insert a comma --,--.

Col. 3, line 22, after "braking;" insert --a linear solenoid valve SLT for controlling the line pressure-- and "linear valve" should read --linear solenoid valve--.

Col. 4, line 25, "Connected" should read --connected--.

Col. 5, line 16, "i" should read --O--.

Col. 7, line 52, "6" should read --∆--.

UNITED STATES PATENT AND TRADEMARK OFFICE
CERTIFICATE OF CORRECTION

PATENT NO. : 5,583,768
DATED : December 10, 1996
INVENTOR(S) : HAMAJIMA et al

It is certified that error appears in the above-indentified patent and that said Letters Patent is hereby corrected as shown below:

Col. 8, line 29, "resent" should read --present--.

Signed and Sealed this

Twenty-third Day of September, 1997

*Attest:*

*Attesting Officer*

BRUCE LEHMAN

*Commissioner of Patents and Trademarks*